United States Patent [19]

Sayles

[11] Patent Number: 5,128,159
[45] Date of Patent: Jul. 7, 1992

[54] METHOD OF MAKING EDIBLE COATINGS FOR PROTECTING PERISHABLE FOODS AGAINST SPOILAGE

[75] Inventor: David C. Sayles, Huntsville, Ala.

[73] Assignee: The United States of America as represented by the Secretary of the Army, Washington, D.C.

[21] Appl. No.: 698,749

[22] Filed: May 6, 1991

[51] Int. Cl.$^5$ ............................................. A23B 7/16
[52] U.S. Cl. ................................. 426/310; 426/93; 426/102; 426/273; 426/309; 426/618; 426/634; 426/656
[58] Field of Search ................. 426/93, 102, 273, 303, 426/309, 310, 634, 618, 656, 506, 507

[56] References Cited

U.S. PATENT DOCUMENTS 4,344,971  8/1982  Garbutt ............................... 426/615

OTHER PUBLICATIONS

Smith et al., 1972, Soybeans: Chemistry and Technology, Avi Publishing Co., Inc., p. 445.

Primary Examiner—Jeanette Hunter
Assistant Examiner—Helen Pratt
Attorney, Agent, or Firm—Hugh P. Nicholson; Freddie M. Bush

[57] ABSTRACT

Edible coatings for protecting perishable foods against spoilage and for significantly extending the life of such foods as fruits and vegetables. A protein derived film is prepared from soybeans, wheat, corn, and mixtures thereof by a process of soaking the grain in water to soften the layer, subjecting the grain-water mixture to the shearing action in a blender to form a milky suspension which is filtered to remove the solids. The residual liquid is heated to denature the higher molecular constituents which are coagulated, allowed to float to the surface, and removed from the denatured proteinaceous solution. The denatured proteinaceous solution is cooled and subsequently employed to coat fruits and vegetable with coatings which function as excellent barriers for preventing the fruits and vegetables from reacting with atmospheric oxygen or carbon dioxide while providing barriers which are permeable to water which precludes their drying out due to dehydration during storage.

2 Claims, No Drawings

METHOD OF MAKING EDIBLE COATINGS FOR PROTECTING PERISHABLE FOODS AGAINST SPOILAGE

DEDICATORY CLAUSE

The invention described herein may be manufactured, used, and licensed by or for the Government for governmental purposes without the payment to me of any royalties thereon.

BACKGROUND OF THE INVENTION

Retarding the spoilage of perishable foods, and significantly extending the useful life of perishable food items such as fruits and vegetable would be of major interest for the fruits and vegetable markets.

Presently, controlling the humidity and temperature for storage of items such as fruits and vegetables is employed to extend useful life by retarding spoilage and reducing their tendencies for drying out. However, providing this means for retarding spoilage and extending useful life for fruits and vegetables adds considerably to the market prices as a result of the costs of the facilities and equipment required for storing these items in a controlled environment. After removing the stored fruits and vegetables to the market place for displaying and selling there is a need to further retard spoilage and extending useful life of these items.

The shelf life of certain food items has been extended experimentally by exposing to radiation; however, the usefulness of this type treatment for such items as fruits and vegetables would appear to be limited and generally, not practical at present market prices.

The need for a treatment procedure for retarding the spoilage of perishable foods items and significantly extending the useful life thereof is readily recognized. Such a treatment procedure that could also be useful in conjunction with presently used storage methods in a controlled environment and also when the perishable food items are removed from the controlled environment to the market place would be attractive, particularly if the treatment procedure provided edible coatings to function as excellent barriers for preventing the perishable food items from reacting with atmospheric oxygen or carbon dioxide. The edible coating should be permeable to water which precludes their drying out due to dehydration.

SUMMARY OF THE INVENTION

Providing a method to retard spoilage of perishable foods and extending the useful storage lives thereof is the primary objective of this invention. Additional objectives will be apparent to those skilled in the perishable foods preservation art from the ongoing disclosure.

The method of retarding the spoilage of perishable foods and significantly extending the life of such foods as fruits and vegetables employs a protein-derived material prepared from the group consisting of soybeans, wheat and corn and related grains. The protein-derived material is applied to the surface of foods to form coatings which function as excellent barriers preventing the fruits and vegetables from reacting with atmospheric oxygen or carbon dioxide.

Extracting of the proteinaceous ingredients from soybeans is accomplished in accordance with the following steps:

1. Soaking the soybeans in water to achieve softening of the layers;
2. Subjecting the soybeans-water mixture to shearing action in a blender;
3. Filtering the "soy milk" which is formed to remove the solid materials; and
4. Heating the residual liquid to denature the higher molecular weight constituents which are coagulated, allowed to float to the surface, and removed.

Applying the protective coatings to the fruits or vegetables is achieved by dipping or spraying the denatured proteinaceous liquid, cooled to room temperature. As an example, peaches treated with the protective coating developed internal discoloration spots only after four weeks as compared to similar discoloration spots after five days for untreated peaches when stored at room temperature.

DESCRIPTION OF THE PREFERRED EMBODIMENT(S)

The proteinaceous ingredient employed in this invention method is extracted from soybeans, wheat or corn in accordance with procedures outlined hereinbelow.

As an example; (1) soybeans are soaked in water to soften the layers; (2) the softened soybeans in a soybean-water mixture are subjected to a shearing action in a blender; (3) the "soy milk" which is formed is filtered to remove the solid materials; and, (4) the residual liquid is heated to denature the higher molecular constituents which are coagulated, floated to the surface, and removed.

The effectiveness of the denatured proteinaceous solution is evaluated by dipping peaches in the cooled to room temperature solution and forming a coating which functions as an excellent barrier for preventing a reaction of the peaches with atmospheric oxygen and carbon dioxide. Peaches were selected because of their poor keeping characteristic and vulnerability to bruising during storage and shipping. The coating is permeable to water which precludes the peaches from drying out due to dehydration during storage.

The following example in Table I illustrates comparative test for the invention.

| COMPARATIVE TEST DATA FOR EVALUATING DENATURED PROTEINACEOUS COATING | | | | |
|---|---|---|---|---|
| SAMPLE | ITEM EVALUATED | COATED* | UNCOATED | INTERNAL DISCOLORATION SPOTS DEVELOPED |
| A | Fresh Peaches | X | — | after four weeks |
| B | Fresh Peaches | — | X | five days |

*coated with "soy milk" prepared as described hereinabove, denatured, and filtered.

I claim:

1. A method to retard spoilage of perishable foods and extending the useful storage lives thereof, said method comprising preparing a denatured proteinaceous solution by the process defined under A, a-e, and coating said perishable foods with said solution as further defined by the method for coating said perishable foods defined under B, a-e, hereinbelow, said process for preparing said denatured proteinaceous solution comprising:

A. providing a source of proteinaceous ingredients selected from the group consisting of dried soybeans, corn, wheat and combinations thereof and completing the process steps a-e set forth hereinbelow for preparing said denatured proteinaceous solution comprising:
   a. soaking said source of proteinaceous ingredients in water to achieve softening of the layers thereof;
   b. subjecting said source of proteinaceous ingredients in a water mixture to shearing action in a blender to shear said softened layers to thereby form a milky suspension;
   c. filtering said milky suspension to remove solid materials;
   d. heating the filtered milky suspension to denature and remove higher molecular weight constituents which are coagulated, floated to surface, and removed;
   e. recovering and cooling said denatured proteinaceous solution for coating said perishable foods; and,
B. completing said method steps a-e set forth hereinbelow for coating said perishable foods comprising:
   a. providing perishable foods selected from the group consisting of fruits and vegetables;
   b. coating said perishable foods with said denatured proteinaceous solution to form coatings which function as excellent barriers for preventing said perishable food from reacting with atmospheric oxygen or carbon dioxide, said barriers being permeable to water which precludes said perishable foods from drying out due to dehydration;
   c. removing excess denatured proteinaceous solution from said perishable foods;
   d. air drying said coated perishable foods; and,
   e. storing said coated perishable foods having extended useful storage lives nd retarded tendencies for spoilage as evidenced by examining time required to develop internal discoloration spots as compared to examining time to develop internal discoloration spots for uncoated perishable foods stored under like conditions.

2. The method to retard spoilage of perishable foods as defined in claim 1 wherein said source of proteinaceous ingredient is soybeans and wherein said denatured proteinaceous solution prepared by process under A, a-e is employed to coat said selected perishable food which is peaches selected from fruit of said group and wherein said examining time is about four weeks for said coated peaches as compared to examining time of about five days for uncoated peaches stored under like conditions.

* * * * *